US007677267B2

(12) United States Patent
Warnick

(10) Patent No.: US 7,677,267 B2
(45) Date of Patent: Mar. 16, 2010

(54) DUNNAGE AIRBAG INFLATION CIRCUIT

(75) Inventor: Stan Clay Warnick, Madison, GA (US)

(73) Assignee: Georgia-Pacific Wood Products LLC, Atlanta, GA (US)

(*) Notice: Subject to any disclaimer, the term of this patent is extended or adjusted under 35 U.S.C. 154(b) by 0 days.

(21) Appl. No.: 12/019,862

(22) Filed: Jan. 25, 2008

(65) Prior Publication Data

US 2008/0185051 A1 Aug. 7, 2008

Related U.S. Application Data

(60) Provisional application No. 60/887,937, filed on Feb. 2, 2007.

(51) Int. Cl.
*F16K 31/12* (2006.01)

(52) U.S. Cl. ...................................... 137/492.5; 251/29

(58) Field of Classification Search .................. 251/26, 251/27, 29; 137/488, 492, 492.5
See application file for complete search history.

(56) References Cited

U.S. PATENT DOCUMENTS 2,960,942 A 11/1960 Pier et al.
3,098,455 A 7/1963 McElroy et al.
3,915,096 A 10/1975 Salisbury
4,051,715 A * 10/1977 Ledeen et al. ............ 73/40.5 R
4,418,737 A * 12/1983 Goodell et al. .............. 152/416
4,565,349 A * 1/1986 Tomlin ........................ 251/29
4,583,566 A * 4/1986 Kalavitz et al. ........ 137/101.19
4,723,474 A * 2/1988 Flohr ............................ 91/36
5,056,558 A 10/1991 Rodgers
5,833,413 A 11/1998 Cornelius
6,293,147 B1 * 9/2001 Parker et al. .................. 73/462
6,746,190 B2 6/2004 Freeman

* cited by examiner

*Primary Examiner*—John Rivell
*Assistant Examiner*—William McCalister
(74) *Attorney, Agent, or Firm*—Michael S. Kerns

(57) ABSTRACT

The dunnage airbag inflation circuit of this invention includes a pilot valve that is controlled by a pressure sensing line in communication with the dunnage bag, and an arrangement of other valves to allow the dunnage bag to inflate up to a certain preset pressure. The pressure sensing line controls pilot air to various valves and ultimately to the main pilot valve allowing airflow to the dunnage bag until the dunnage bag reaches a certain preset pressure. The inflation circuit also includes (i) a safety pressure valve to stop airflow to the dunnage bag if for some reason the dunnage bag continues to be inflated past the preset pressure, and (ii) a stop valve that allows an operator to manually override the pressure valve and stop the airflow to the dunnage bag.

6 Claims, 2 Drawing Sheets

DUNNAGE AIRBAG INFLATION CIRCUIT

CROSS-REFERENCE TO RELATED APPLICATIONS

This application claims priority from co-pending U.S. Provisional Application No. 60/887,937 filed Feb. 2, 2007, the contents of which are incorporated herein by reference.

FIELD OF THE INVENTION

The present invention relates to a pneumatic inflation system for a dunnage bag. More specifically, this invention relates to a pneumatic inflation system for a dunnage bag that prevents overinflation of the bag.

BACKGROUND OF THE INVENTION

Trucks, railroad cars, airplanes, ships and other transportation vehicles are used to transport freight from location to location, typically from the manufacturing site to the distribution or sales location. It is important that the freight transported in such vehicles does not move or shift positions to a significant extent. Minimizing this movement prevents damage to the transportation vehicles and to the freight itself. There are a number of ways to prevent such unwanted movement of the freight in transportation vehicles. One way is to provide one or more inflatable dunnage bags in the transportation vehicle that take up the space between the load of freight and the walls and ceiling of the transportation vehicle or the space between the individual freight.

Dunnage bags are typically plastic or vinyl bags that are inflated at the shipping dock where the freight is loaded into the transportation vehicle. A source of compressed air, or other fluid, is provided to the dunnage bag until the dunnage bag achieves the desired inflation pressure. At that point, the operator can either disconnect the source of compressed air or otherwise cease the flow of compressed air to the dunnage bag. Without adequate control, it is possible for the operator to allow the dunnage bag to be overinflated, which could lead to the bag bursting and potentially injuring the operator as well as any other personnel or property in the area.

Up to now, there has not been an effective system that would provide for the safe and controlled inflation of a dunnage bag. Thus, it is an object of this invention to provide such a system to facilitate the safe and controlled inflation of a dunnage bag.

SUMMARY OF THE INVENTION

The dunnage airbag inflation circuit of this invention includes a directional pilot valve that is controlled by a pressure sensing line in communication with the dunnage bag, and an arrangement of other valves to allow the dunnage bag to be inflated up to a certain preset pressure. The pressure sensing line controls pilot air to various valves and ultimately to the directional pilot valve allowing airflow to the dunnage bag until the dunnage bag reaches a certain preset pressure. The inflation circuit also includes (i) one or more safety pressure valves to stop airflow to the dunnage bag if for some reason the dunnage bag continues to be inflated past the preset pressure, and (ii) a stop valve that allows an operator to manually stop the airflow to the dunnage bag.

The dunnage bag inflation circuit thus provides multiple safeguards to minimize the chances that the dunnage bag will be inadvertently overinflated, which markedly decreases the chances that the dunnage bag could explode.

BRIEF DESCRIPTION OF THE DRAWINGS

The preferred embodiments of the present invention are illustrated in the appended drawings in which like reference numbers refer to like elements and in which.

DETAILED DESCRIPTION OF THE INVENTION

Figure 1:
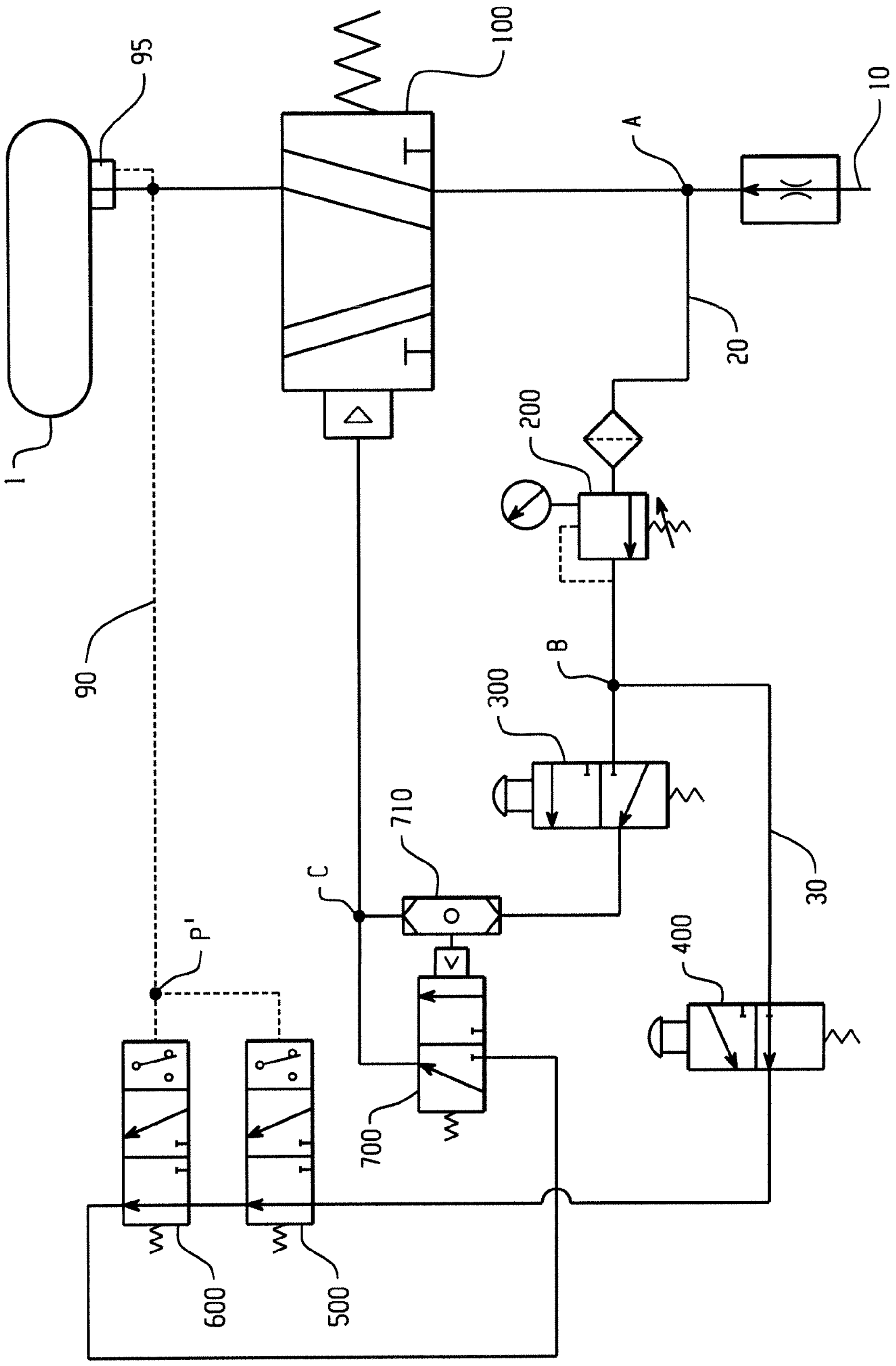
FIG. 1 is a schematic diagram of one embodiment of the inflation circuit of the invention.

The dunnage airbag inflation circuit of this invention includes a directional pilot valve 100 that is controlled by a pressure sensing line 90 in communication with the dunnage bag 1, and an arrangement of other valves to allow dunnage bag 1 to inflate up to a certain preset pressure. Pressure sensing line 90 controls pilot air to various valves and ultimately to directional pilot valve 100 allowing airflow to dunnage bag 1 until dunnage bag 1 reaches a certain preset pressure. It is important to ensure an adequate opening to dunnage bag 1 to prevent undue backpressure when dunnage bag 1 is being inflated. Excessive backpressure could adversely affect the operation of the inflation circuit of this invention. The inflation circuit also includes (i) one or more safety pressure valves 500 and 600 to stop airflow to dunnage bag 1 if for some reason dunnage bag 1 continues to be inflated past the preset pressure, and (ii) a stop valve 400 that allows an operator to manually stop the airflow to dunnage bag 1.

A first embodiment of the dunnage bag inflation circuit of this invention is shown in FIG. 1. In this embodiment, supply air is provided through a supply line 10 to directional pilot valve 100 and to dunnage bag 1. Pilot air is taken from supply line 10 at junction A along pilot line 20 to a pressure filter regulator 200, which ensures that the pressure along pilot line 20 is a predetermined pressure. The set pressure for pressure filter regulator 200 is typically determined as the pressure needed to shift, i.e. open, directional pilot valve 100. A start valve 300 is provided downstream of pressure filter regulator 200 along pilot line 20. A junction B is provided along supply line 20 for a branch pilot line 30, along which stop valve 400 is provided. At least one, but preferably two, pressure valves 500 and 600 are located downstream of stop valve 400 along branch pilot line 30. A pilot valve 700 is located downstream of pressure valves 500 and 600. Branch pilot line 30 continues from pilot valve 700 to directional pilot valve 100. Shuttle valve 710 is connected to pilot valve 700 and is also located along pilot line 20, which also extends to and intersects with branch pilot line 30 at junction C. Pressure sensing line 90 is in fluid communication with dunnage bag 1 via manifold 95. Pressure sensing line 90 is also in fluid communication with pressure valves 500 and 600.

Once the dunnage bag inflation circuit is connected to a source of pressurized fluid, such as air, start valve 300 can be switched on to allow dunnage bag 1 to be inflated. Specifically, once start valve 300 is switched on, pilot air travels through pilot line 20 through start valve 300 and to shuttle valve 710, which is opened by the pilot air pressure, thus opening pilot valve 700. Simultaneously, the pilot air in branch pilot line 30 travels past stop valve 400, which is in a normally open position, through pressure valves 500 and 600, which are also in a normally open position, to pilot valve 700. This pilot air traveling along branch pilot line 30 flows through pilot valve 700 and to directional pilot valve 100. This pilot air in turn maintains directional pilot valve 100 open to allow supply air to flow to dunnage bag 1 and thus inflate dunnage bag 1. Pilot air also flows to shuttle valve 710 from junction C and adjusts the location of the shuffle in shuttle valve 710 to continue to allow pilot air to enter shuttle valve 710 from junction C rather than from pilot line 30.

Pressure valves 500 and 600 are preset to a desired pressure. For example, pressure valve 500 can be set to a first pressure which is the desired pressure for dunnage bag 1. Once dunnage bag 1 reaches that pressure, pressure valve 500 shuts off preventing pilot air flow through pressure valve 500. This shut off occurs since pressure sensing line 90 is in fluid communication with pressure valve 500 and communicates the pressure in dunnage bag 1 to pressure valve 500. If for some reason, pressure valve 500 fails to operate, pressure valve 600 is used as a back up. Pressure valve 600 is also connected to pressure sensing line 90 and may be set at a slightly higher pressure than the setting for pressure valve 500. Thus pressure valve 600 will shut off pilot air flow through pressure valve 600 if pilot air continues to flow through pressure valve 500 after the desired pressure in dunnage bag 1 is reached.

Once pressure valve 500 or 600 shuts off the downstream flow of pilot air, pilot air no longer flows past these valves to directional pilot valve 700. This in turn closes directional pilot valve 100 and prevents additional air flow from the pressurized air supply to dunnage bag 1. Alternatively, stop valve 400 can be depressed to prevent pilot air from flowing along branch pilot line to directional pilot valve 700 to thus close directional pilot valve 100.

Any commercially available valves may be used for the first embodiment of the dunnage bag inflation circuit of this invention. A 4-way, 2-position single remote pilot valve from Parker Hannifin Corporation may be used for directional pilot valve 100. A Ross Controls consolidated pressure regulator may be used for pressure filter regulator 200. 3-way spool valves from Clippard Instrument Laboratory, Inc. may be used for start valve 300 and stop valve 400. A 3-way air-piloted valve from Clippard Instrument Laboratory, Inc. may be used for pilot valve 700 and a shuttle valve from Clippard Instrument Laboratory, Inc. may be used for shuttle valve 710. 700 Pressure Series pilot actuated pressure valves from Airtrol Inc. may be used for pressure valves 500 and 600.

Figure 2:
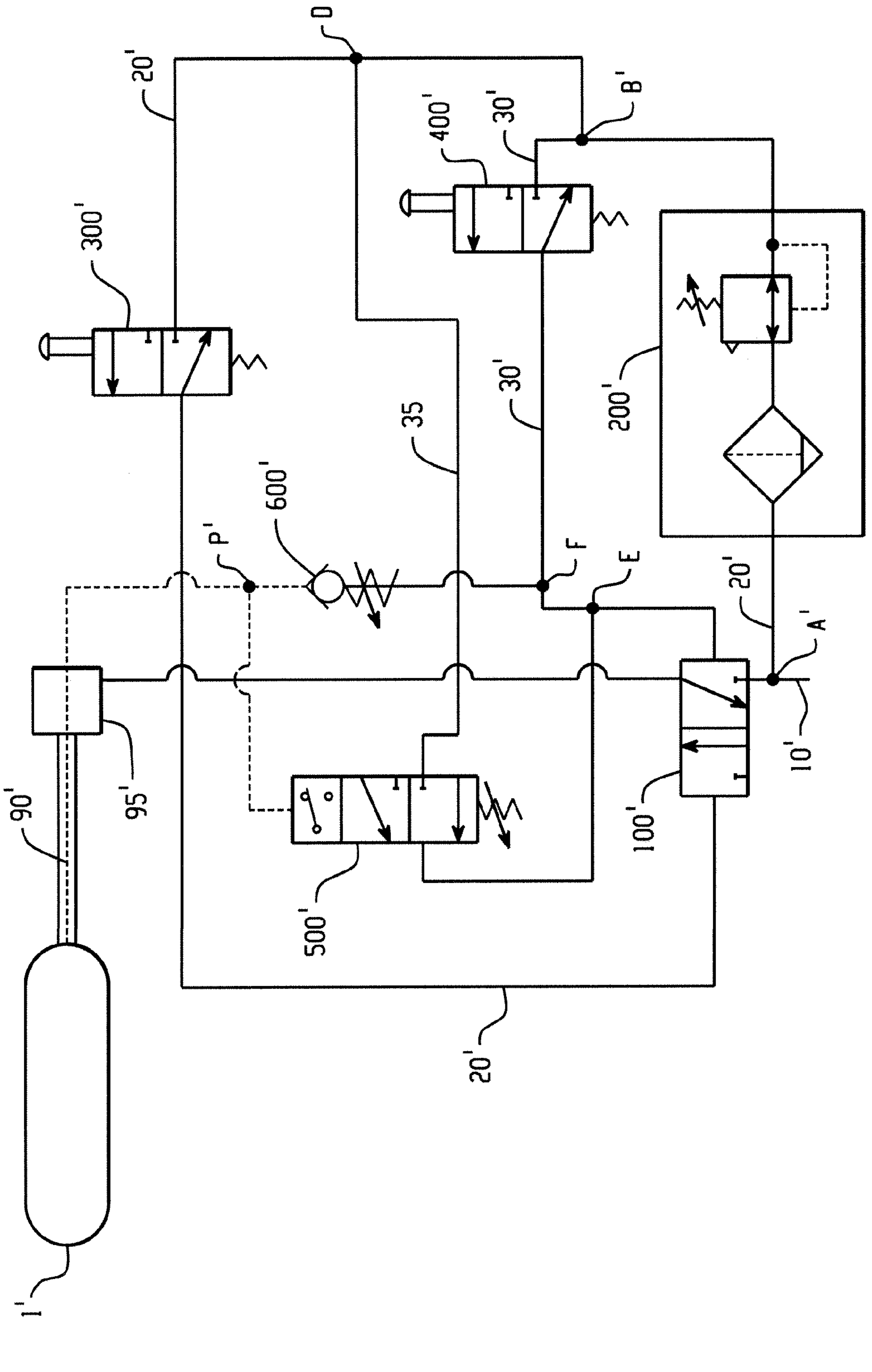
FIG. 2 is a schematic diagram of a second embodiment of the inflation circuit of the invention.

Another embodiment of the dunnage bag inflation circuit is shown in FIG. 2. In this embodiment, supply air is provided through a supply line 10' to directional pilot valve 100' and dunnage bag 1'. Pilot air is taken from supply line 10' at junction A' to a pressure filter regulator 200' along pilot line 20'. A start valve 300' is provided downstream of pressure filter regulator 200' along pilot line 20'. Pilot line 20' continues from start valve 300' to directional pilot valve 100'. A junction B' is provided along supply line 20' for a branch pilot line 30', along which stop valve 400' is provided. Branch pilot line 30' continues from stop valve 400' to directional pilot valve 100'. A junction D is provided along pilot line 20' for a second branch pilot line 35, which is in fluid communication with and connects to pressure valve 500'. Second branch pilot line 35 continues from pressure valve 500' and joins branch pilot 30' at junction E so second branch pilot line 35 is in fluid communication with directional pilot valve 100'. Pressure sensing line 90' is in fluid communication with dunnage bag 1' through manifold 95'. Pressure sensing line 90' is also in fluid communication with pressure valve 500'.

Once the dunnage bag inflation circuit is connected to a source of pressurized fluid, such as air, start valve 300' can be switched on to allow dunnage bag 1' to be inflated. Specifically, once start valve 300' is switched on, pilot air travels through pilot line 20' to directional pilot valve 100' to open directional pilot valve 100'. Simultaneously, pilot air in branch pilot line 30' travels to stop valve 400', which is in a normally closed position. Branch pilot line 30' continues past stop valve 400' so it is in fluid communication with directional pilot valve 100'. In addition, pilot air in second branch pilot line 35 travels to pressure valve 500', which is also in a normally closed position. Second branch pilot line 35 continues past pressure valve 500' so it joins branch pilot line 30' at junction E and thus is in fluid communication with directional pilot valve 100'.

Pressure valve 500' is preset to a desired pressure, which would normally be the desired pressure for dunnage bag 1'. In this embodiment, once dunnage bag 1' reaches that pressure, pressure valve 500' opens allowing pilot air to flow therethrough to branch pilot line 30' and to directional pilot valve 100'. This shift in pressure valve 500' occurs since pressure sensing line 90' is in fluid communication with pressure valve 500' and communicates the pressure in dunnage bag 1' to pressure valve 500'. Once pressure valve 500' opens to allow the downstream flow of pilot air through branch pilot line 30', directional pilot valve 100' closes preventing additional air flow from the pressurized supply to dunnage bag 1'.

If the operator wishes to stop filling dunnage bag 1 prior to complete inflation, the operator can activate stop valve 400'. This allows pilot air to flow through branch pilot line 30' to directional pilot valve 100' thus closing it and preventing further air flow to dunnage bag 1.

A pressure relief valve 600' may be placed between pressure sensing line 90' and directional pilot valve 100'. This valve can be set at any desired pressure above the desired pressure of dunnage bag 1'. If pressure valve 500' fails, air pressure in pressure sensing line 90' will increase until the set pressure in pressure relief valve 600' is reached. At that point, pressure relief valve will open to allow air flow to continue in pressure sensing line 90' to branch pilot line 30' at junction F and finally to directional pilot valve 100', thus closing directional pilot valve 100'.

Any commercially available products may be used for the valves used in this embodiment of the dunnage bag inflation circuit. For example, a 3-way compressed air operated control valve from McMaster-Carr may be used for directional pilot valve 100'. A modular filter/regulator, also from McMaster-Carr may be used for pressure filter regulator 200'. Compressed air directional control valves, also from McMaster-Carr may be used for start valve 300' and stop valve 400'. A 700 Pressure Series pilot actuated pressure valve from Airtrol Inc. may be used for pressure valve 500'. A McMaster-Carr pressure relief valve may be used for pressure relief valve 600'.

Thus it is seen that a dunnage bag inflation circuit is provided that is efficient and safe and that facilitates the prevention of the overinflation of the dunnage bag.

I claim:

1. An inflation circuit, comprising:

a directional pilot valve;

a pressure filter regulator in fluid communication with the directional pilot valve;

a start valve in fluid communication with the pressure filter regulator;

a normally open position stop valve in fluid communication with the pressure filter regulator;

a first pressure valve in fluid communication with the stop valve;

a pilot valve in fluid communication with the first pressure valve and the directional pilot valve; and a shuttle valve in fluid communication with the pilot valve, the directional pilot valve and the start valve.

2. The inflation circuit of claim 1 further comprising a second pressure valve in fluid communication with the first pressure valve and the pilot valve.

3. The inflation circuit of claim 1 wherein the directional pilot valve is connected to a source of pressurized fluid and in fluid communication with an inflatable element.

4. The inflation circuit of claim 3 wherein the first pressure valve is in fluid communication with the inflatable element.

5. The inflation circuit of claim 2 wherein the directional pilot valve is connected to a source of pressurized fluid and is in fluid communication with an inflatable element.

6. The inflation circuit of claim 5 wherein the first pressure valve and the second pressure valve are in fluid communication with the inflatable element.

* * * * *